US010018052B2

(12) United States Patent
Snyder et al.

(10) Patent No.: US 10,018,052 B2
(45) Date of Patent: Jul. 10, 2018

(54) GAS TURBINE ENGINE COMPONENT HAVING ENGINEERED VASCULAR STRUCTURE

(71) Applicant: UNITED TECHNOLOGIES CORPORATION, Farmington, CT (US)

(72) Inventors: Daniel A. Snyder, Manchester, CT (US); Tracy A. Propheter-Hinckley, Manchester, CT (US); Dominic J. Mongillo, West Hartford, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 172 days.

(21) Appl. No.: 14/948,669

(22) Filed: Nov. 23, 2015

(65) Prior Publication Data
US 2016/0076384 A1    Mar. 17, 2016

Related U.S. Application Data

(63) Continuation-in-part of application No. 14/654,676, filed as application No. PCT/US2013/032003 on Mar. 15, 2013.
(Continued)

(51) Int. Cl.
*F01D 5/18*         (2006.01)
*F04D 29/58*        (2006.01)
(Continued)

(52) U.S. Cl.
CPC .............. *F01D 5/186* (2013.01); *F01D 9/02* (2013.01); *F01D 9/041* (2013.01); *F01D 25/12* (2013.01);
(Continued)

(58) Field of Classification Search
CPC ... F01D 5/147; F01D 5/16; F01D 5/18; F01D 5/181; F01D 5/182; F01D 5/183;
(Continued)

(56) References Cited

U.S. PATENT DOCUMENTS 3,584,972 A    6/1971  Bratkovich et al.
3,864,199 A    2/1975  Meginnis et al.
(Continued)

FOREIGN PATENT DOCUMENTS

DE    4338457 A1    5/1995
DE    10261071 A1   7/2004
(Continued)

OTHER PUBLICATIONS

European Search Report for European Patent Application No. 16199685.5 completed Mar. 13, 2017.
(Continued)

*Primary Examiner* — Jason Shanske
*Assistant Examiner* — Alexander White
(74) *Attorney, Agent, or Firm* — Carlson, Gaskey & Olds, P.C.

(57) ABSTRACT

A component according to an exemplary aspect of the present disclosure includes, among other things, a wall and a hollow vascular engineered lattice structure formed inside of the wall. The hollow vascular engineered lattice structure has an inlet hole and an outlet hole that communicate fluid into and out of the hollow vascular structure. The hollow vascular engineered lattice structure further has at least one resupply inlet hole between the inlet hole and the outlet hole to communicate additional fluid into the hollow vascular engineered lattice structure.

22 Claims, 7 Drawing Sheets

Related U.S. Application Data (60) Provisional application No. 61/757,441, filed on Jan. 28, 2013, provisional application No. 61/746,893, filed on Dec. 28, 2012.

(51) Int. Cl.
| | |
|---|---|
| *F01D 9/04* | (2006.01) |
| *F01D 25/12* | (2006.01) |
| *F01D 9/02* | (2006.01) |
| *F01D 11/08* | (2006.01) |
| *F04D 29/54* | (2006.01) |
| *F04D 29/32* | (2006.01) |
| *F04D 29/52* | (2006.01) |

(52) U.S. Cl.
CPC .......... *F04D 29/5846* (2013.01); *F01D 11/08* (2013.01); *F04D 29/526* (2013.01); *F05D 2220/32* (2013.01); *F05D 2230/21* (2013.01); *F05D 2230/30* (2013.01); *F05D 2250/28* (2013.01); *F05D 2260/202* (2013.01); *F23R 2900/03041* (2013.01); *F23R 2900/03042* (2013.01); *F23R 2900/03043* (2013.01); *Y02T 50/673* (2013.01); *Y02T 50/676* (2013.01)

(58) Field of Classification Search
CPC .......... F01D 5/184; F01D 5/186; F01D 5/187; F01D 9/02; F01D 25/08; F01D 9/041; F01D 11/08; F01D 25/12; F05D 2260/202; F05D 2260/203; F05D 2260/204; F05D 2260/205; F05D 2220/32; F05D 2230/21; F05D 2230/30; F05D 2250/28; F04D 29/526; F04D 29/5846; F23R 2900/03042; F23R 2900/03043
See application file for complete search history.

(56) References Cited

U.S. PATENT DOCUMENTS

| | | | |
|---|---|---|---|
| 3,900,629 | A | 8/1975 | Spencer |
| 4,004,056 | A | 1/1977 | Carroll |
| 4,091,146 | A | 5/1978 | Darrow |
| 4,168,348 | A | 9/1979 | Bhangu et al. |
| 4,269,032 | A | 5/1981 | Meginnis et al. |
| 4,292,376 | A | 9/1981 | Hustler |
| 4,302,940 | A | 12/1981 | Meginnis |
| 4,359,181 | A | 11/1982 | Chisholm |
| 4,407,632 | A * | 10/1983 | Liang ............... F01D 5/187 |
| | | | 415/115 |
| 4,440,834 | A | 4/1984 | Aubert et al. |
| 4,751,962 | A | 6/1988 | Havekost et al. |
| 5,193,611 | A | 3/1993 | Hesselgreaves |
| 5,353,867 | A | 10/1994 | Jaspers |
| 5,545,003 | A | 8/1996 | O'Connor et al. |
| 5,607,778 | A | 3/1997 | Padden |
| 5,634,189 | A | 5/1997 | Rossmann et al. |
| 5,752,801 | A | 5/1998 | Kennedy |
| 5,960,863 | A | 10/1999 | Hua |
| 5,975,841 | A | 11/1999 | Lindemuth et al. |
| 6,126,396 | A | 10/2000 | Doughty et al. |
| 6,167,952 | B1 | 1/2001 | Downing |
| 6,235,370 | B1 | 5/2001 | Merrill et al. |
| 6,397,922 | B1 | 6/2002 | Sachs et al. |
| 6,412,541 | B2 | 7/2002 | Roesler et al. |
| 6,508,623 | B1 | 1/2003 | Shiozaki et al. |
| 6,511,762 | B1 | 1/2003 | Lee et al. |
| 6,599,568 | B2 | 7/2003 | Lee et al. |
| 6,617,003 | B1 | 9/2003 | Lee et al. |
| 6,629,559 | B2 | 10/2003 | Sachs et al. |
| 6,761,956 | B2 | 7/2004 | Lee et al. |
| 6,955,523 | B2 | 10/2005 | McClelland |
| 7,048,986 | B2 | 5/2006 | Shah et al. |
| 7,063,131 | B2 | 6/2006 | Northrop |
| 7,070,853 | B2 | 7/2006 | Paul |
| 7,141,812 | B2 | 11/2006 | Appleby et al. |
| 7,144,220 | B2 | 12/2006 | Marcin, Jr. |
| 7,153,464 | B2 | 12/2006 | Millard et al. |
| 7,204,089 | B2 | 4/2007 | Schreiber |
| 7,294,164 | B2 | 11/2007 | Merkel |
| 7,402,335 | B2 | 7/2008 | Bolms et al. |
| 7,500,828 | B2 | 3/2009 | Landis |
| 7,540,710 | B2 | 6/2009 | Grote et al. |
| 7,597,533 | B1 | 10/2009 | Liang |
| 7,658,590 | B1 | 2/2010 | Spanks |
| 7,665,956 | B2 * | 2/2010 | Mitchell ............. F01D 5/182 |
| | | | 415/115 |
| 7,670,675 | B2 | 3/2010 | Heselhaus et al. |
| 7,717,677 | B1 | 5/2010 | Liang |
| 7,775,766 | B2 | 8/2010 | Meier et al. |
| 7,785,098 | B1 | 8/2010 | Appleby et al. |
| 7,810,552 | B2 | 10/2010 | Slaughter |
| 7,866,372 | B2 | 1/2011 | Slaughter |
| 7,866,377 | B2 | 1/2011 | Slaughter |
| 7,968,144 | B2 | 6/2011 | James et al. |
| 8,052,389 | B2 | 11/2011 | Kopmels |
| 8,167,573 | B2 | 5/2012 | Merrill et al. |
| 8,257,809 | B2 | 9/2012 | Morrison et al. |
| 8,327,911 | B2 | 12/2012 | Kush et al. |
| 2005/0045306 | A1 | 3/2005 | Petervary et al. |
| 2006/0251515 | A1 | 11/2006 | Landis |
| 2006/0285975 | A1 | 12/2006 | Landis |
| 2007/0214759 | A1 | 9/2007 | Merkel |
| 2007/0243069 | A1 | 10/2007 | Read |
| 2007/0275210 | A1 | 11/2007 | Heselhaus |
| 2008/0254276 | A1 | 10/2008 | James et al. |
| 2009/0011919 | A1 | 1/2009 | Noguchi et al. |
| 2010/0025001 | A1 * | 2/2010 | Lee ............... B22C 7/02 |
| | | | 164/23 |
| 2010/0291401 | A1 | 11/2010 | Medina et al. |
| 2011/0262695 | A1 | 10/2011 | Lee et al. |
| 2011/0268580 | A1 | 11/2011 | Bryk et al. |
| 2011/0293434 | A1 | 12/2011 | Lee et al. |
| 2012/0070306 | A1 * | 3/2012 | Lee ............... F01D 5/187 |
| | | | 416/97 R |
| 2012/0237786 | A1 * | 9/2012 | Morrison ............. B22D 19/00 |
| | | | 428/596 |
| 2012/0291991 | A1 | 11/2012 | Denkenberger |
| 2013/0001837 | A1 | 1/2013 | Göhler et al. |
| 2015/0323186 | A1 | 11/2015 | Xu |

FOREIGN PATENT DOCUMENTS

| | | |
|---|---|---|
| EP | 475658 A1 | 3/1992 |
| EP | 896127 B1 | 7/2007 |
| EP | 2199725 | 6/2010 |
| EP | 2199725 B1 | 10/2011 |
| GB | 2284825 A | 6/1995 |
| WO | 03006883 A1 | 1/2003 |
| WO | 2007014005 A1 | 2/2007 |
| WO | 2011069015 A2 | 6/2011 |
| WO | 2011133359 A1 | 10/2011 |
| WO | 2013013995 A1 | 1/2013 |
| WO | 2014105108 A1 | 7/2014 |
| WO | 2015009448 | 1/2015 |

OTHER PUBLICATIONS

International Preliminary Report of Patentability dated Jul. 9, 2015 for International Application No. PCT/US2013/041054.
International Search Report and Written Opinion dated Dec. 17, 2013 for International Application No. PCT/US2013/032003.
International Search Report and Written Opinion dated Jan. 27, 2014 for International Application No. PCT/US2013/032202.
International Search Report and Written Opinion dated Sep. 4, 2013 for International Application No. PCT/US2013/041054.

* cited by examiner

GAS TURBINE ENGINE COMPONENT HAVING ENGINEERED VASCULAR STRUCTURE

RELATED APPLICATIONS

This application is a continuation-in-part of prior U.S. application Ser. No. 14/654,676, filed Jun. 22, 2015, which is a national stage entry of PCT Application PCT/US13/32003, filed Mar. 15, 2013. The '003 PCT Application claims the benefit of U.S. Provisional Application No. 61/757,441, filed Jan. 28, 2013, and claims the benefit of U.S. Provisional Application No. 61/746,893, filed Dec. 28, 2012.

The '676 Application, the '003 PCT Application, the '441 Provisional Application, and the '893 Provisional Application are herein incorporated by reference in their entirety.

BACKGROUND

This disclosure relates to a gas turbine engine, and more particularly to a gas turbine engine component having an engineered vascular structure with one or more resupply passages.

Gas turbine engines typically include a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

Due to exposure to hot combustion gases, numerous components of a gas turbine engine may include cooling schemes that circulate airflow to cool the component during engine operation. Thermal energy is transferred from the component to the airflow as the airflow circulates through the cooling scheme to cool the component. Known cooling schemes may be inefficient and lack structural integrity.

SUMMARY

A component according to an exemplary aspect of the present disclosure includes, among other things, a wall and a hollow vascular engineered lattice structure formed inside of the wall. The hollow vascular engineered lattice structure has an inlet hole and an outlet hole that communicate fluid into and out of the hollow vascular structure. The hollow vascular engineered lattice structure further has at least one resupply inlet hole between the inlet hole and the outlet hole to communicate additional fluid into the hollow vascular engineered lattice structure.

In a further non-limiting embodiment of the foregoing component, the hollow vascular engineered lattice structure includes hollow passages that extend through one or more nodes and branches of the hollow vascular engineered lattice structure.

In a further non-limiting embodiment of the foregoing component, the at least one resupply inlet hole is configured to communicate fluid into one of the nodes.

In a further non-limiting embodiment of the foregoing component, the one or more nodes and branches are one of (1) uniformly distributed throughout the hollow vascular engineered lattice structure and (2) non-uniformly distributed throughout the hollow vascular engineered lattice structure.

In a further non-limiting embodiment of the foregoing component, the branches are one of (1) orthogonal to the nodes and (2) non-orthogonal to the nodes.

In a further non-limiting embodiment of the foregoing component, the at least one resupply inlet hole is inclined at a non-zero angle relative to a normal to the wall.

In a further non-limiting embodiment of the foregoing component, the at least one resupply inlet hole has an inlet section with an increased dimension relative to a remainder of the at least one resupply inlet hole.

In a further non-limiting embodiment of the foregoing component, the vascular engineered lattice structure is one of a co-flow vascular engineered lattice structure and a counter-flow vascular engineered lattice structure.

In a further non-limiting embodiment of the foregoing component, the outlet hole is a film cooling hole.

Another component according to an exemplary aspect of the present disclosure includes, among other things, a wall and a solid vascular engineered lattice structure formed inside of the wall. The solid vascular engineered lattice structure has an inlet hole and an outlet hole that communicates fluid into and out of the solid vascular engineered lattice structure. The solid vascular engineered lattice structure further has at least one resupply inlet hole between the inlet hole and the outlet hole to communicate additional fluid into the solid vascular engineered lattice structure.

In a further non-limiting embodiment of the foregoing component, the solid vascular structure includes a plurality of nodes, a plurality of branches that extend between the plurality of nodes, and a plurality of passages extending between the plurality of nodes and the plurality of passages.

In a further non-limiting embodiment of the foregoing component, the at least one resupply inlet hole is configured to communicate fluid into a space between adjacent ones of the nodes.

In a further non-limiting embodiment of the foregoing component, the plurality of nodes and the plurality of branches are one of (1) uniformly distributed throughout the solid vascular engineered lattice structure and (2) non-uniformly distributed throughout the solid vascular engineered lattice structure.

In a further non-limiting embodiment of the foregoing component, the plurality of branches are one of (1) orthogonal to the plurality of nodes and (2) non-orthogonal to the plurality of nodes.

In a further non-limiting embodiment of the foregoing component, the at least one resupply inlet hole is inclined at a non-zero angle relative to a normal to the wall.

In a further non-limiting embodiment of the foregoing component, the at least one resupply inlet hole has an inlet section with an increased dimension relative to a remainder of the at least one resupply inlet hole.

In a further non-limiting embodiment of the foregoing component, the outlet hole is a film cooling hole.

In a further non-limiting embodiment of the foregoing component, the wall is part of a blade, a vane or a blade outer air seal (BOAS) of a gas turbine engine.

A method for producing a component according to an exemplary aspect of the present disclosure includes, among other things, forming a vascular engineered lattice structure inside of a wall of the component. The vascular engineered lattice structure has at least one of a hollow lattice structure and a solid lattice structure and including an inlet hole and an outlet hole that communicate fluid into and out of said vascular engineered lattice structure. The vascular engineered lattice structure further includes at least one resupply inlet hole between the inlet hole and the outlet hole to communicate additional fluid into the vascular engineered lattice structure.

In a further non-limiting embodiment of the foregoing component, the step of forming the vascular engineered lattice structure includes: forming a core using an additive manufacturing process, and using the core to cast the vascular engineered lattice structure.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
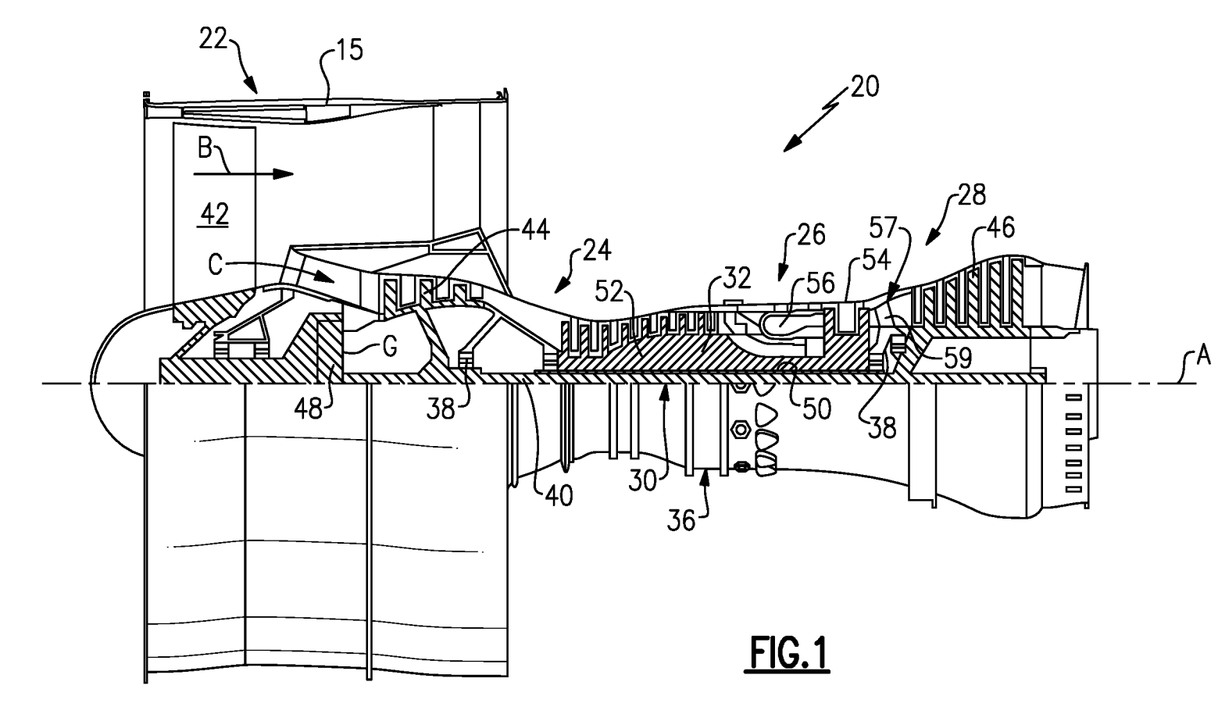
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The geared architecture 48 in this example includes a gearbox G, which is a housing, and encloses one or more gears, such as a sun gear and one or more planetary gears. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°\text{ R})/(518.7°\text{ R})]^{0.5}$. The "Low corrected fan tip speed" as disclosed herein according to one non-limiting embodiment is less than about 1150 feet/second (350.5 meters/second).

Various components of the gas turbine engine 20, including but not limited to the airfoils of the blades and the vanes of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling schemes for cooling the parts during engine operation.

Among other features, this disclosure relates to gas turbine engine component cooling schemes that include vascular engineered lattice structures inside the walls of the gas turbine engine component. The exemplary structures described herein provide effective localized convective cooling, and is some embodiments, can provide resupply and film cooling for gas turbine engine components that may be subject to the hot combustion gases that are communicated through the core flow path C.

Figure 2:
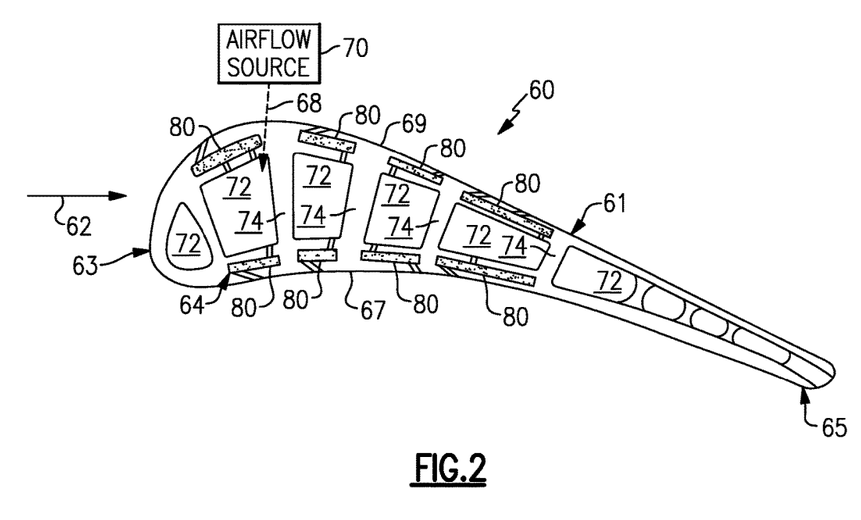
FIG. 2 illustrates a component that can be incorporated into a gas turbine engine.

FIG. 2 illustrates a component 60 that can be incorporated into a gas turbine engine, such as the gas turbine engine 20 of FIG. 1. The component 60 includes a body portion 61 that axially extends between a leading edge portion 63 and a trailing edge portion 65. The body portion 63 may further include a first (pressure) side wall 67 and a second (suction) side wall 69 that are spaced apart from one another and axially extend between the leading edge portion 63 and the trailing edge portion 65. Although shown in cross-section, the body portion 61 would also extend radially across a span.

In this embodiment, the body portion 61 is representative of an airfoil. For example, the body portion 61 could be an airfoil that extends from platform and root portions (i.e., where the component is a blade), or could alternatively extend between inner and outer platforms (i.e., where the component 60 is a vane). In yet another embodiment, the component 60 could include a non-airfoil component, including but not limited to, a blade outer air seal (BOAS), a combustor liner, a turbine exhaust case liner, or any other part that may require dedicated cooling.

A gas path 62 is communicated axially downstream through the gas turbine engine 20 in a direction that extends from the leading edge portion 63 toward the trailing edge portion 65 of the body portion 61. The gas path 62 represents the communication of core airflow along the core flow path C (see FIG. 1).

A cooling scheme 64 may be disposed inside of the body portion 61 for cooling the internal and external surface areas of the component 60. For example, the cooling scheme 64 can include one or more cavities 72 that may radially, axially and/or circumferentially extend inside of the body portion 61 to establish cooling passages for receiving an airflow 68 (or some other fluid). The airflow 68 may be communicated into one or more of the cavities 72 from an airflow source 70 that is external to the component 60 to cool the component 60. In one embodiment, the airflow 68 is communicated to the cooling scheme 64 through a root portion of the component 60 (e.g., where the component is a blade).

The airflow 68 is generally of a lower temperature than the airflow of the gas path 62 that is communicated across the body portion 61. In one particular embodiment, the airflow 68 is a bleed airflow that can be sourced from the compressor section 24 or any other portion of the gas turbine engine 20 that has a lower temperature as compared to the component 60. The airflow 68 can be circulated through the cooling scheme 64 to transfer thermal energy from the component 60 to the airflow 68 thereby cooling the component 60.

In this non-limiting embodiment, the exemplary cooling scheme 64 includes a plurality of cavities 72 that extend inside of the body portion 61. However, the cooling scheme 64 is not necessarily limited to the configuration shown, and it will be appreciated that a greater or fewer number of cavities, including only a single cavity, may be defined inside of the body portion 61. The cavities 72 communicate the airflow 68 through the cooling scheme 64, such as along a serpentine or linear path, to cool the body portion 61.

Ribs 74 may extend between the first side wall 67 and the second side wall 60 of the body portion 61. The ribs 74 may also radially extend across a span of the body portion 61.

The exemplary cooling scheme 64 may additionally include one or more vascular engineered lattice structures 80 that are disposed inside sections of the body portion 61 of the component 60. For example, discrete portions of the component 60 may embody a vascular engineered lattice structure, or the entire component 60 can be constructed of a vascular engineered lattice structure. Multiple embodiments of such vascular engineered lattice structures are described in detail below.

Figure 3:
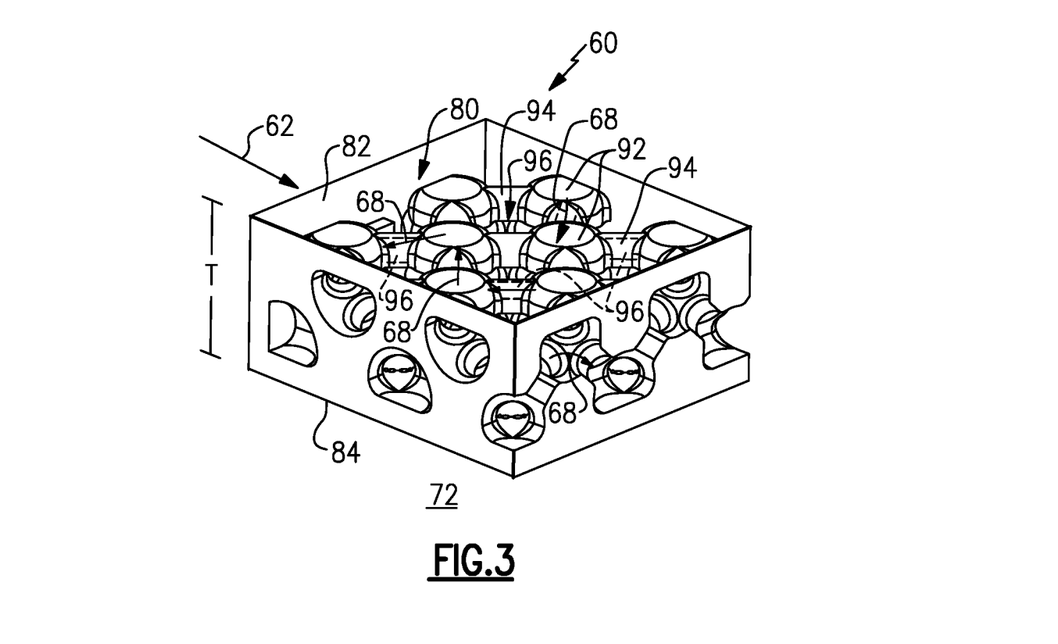
FIG. 3 shows one exemplary engineered vascular structure of a gas turbine engine component.
Figure 4:
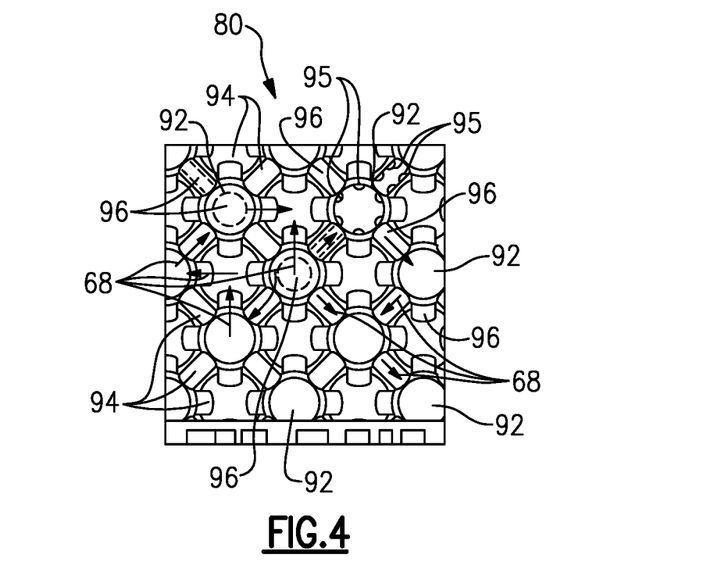
FIG. 4 illustrates another view of the engineered vascular structure of FIG. 3.

FIGS. 3 and 4 illustrate one exemplary vascular engineered lattice structure 80 that can be incorporated into a component 60. The vascular engineered lattice structure 80 may be incorporated into any section or sections of a gas turbine engine component. In this disclosure, the term "vascular engineered lattice structure" denotes a structure of known surface and flow areas that includes a specific structural integrity.

As discussed in greater detail below, the vascular engineered lattice structure 80 of FIGS. 3 and 4 is a hollow vascular structure. The hollow vascular structure shown in FIGS. 3 and 4 defines a solid material with discrete, interconnected cooling passages that are connected through common nodes to control the flow of airflow throughout the hollow vascular structure.

The specific design and configuration of the vascular engineered lattice structure 80 of FIG. 3 is not intended to be limited to only the configuration shown. It will be appreciated that because the vascular engineered lattice structure 80 is an engineered structure, the vascular arrangement of these structures can be tailored to the specific cooling and structural needs of any given gas turbine engine component. In other words, the vascular engineered lattice structure 80 can be tailored to match external heat load and local life requirements by changing the design and density of the vascular engineered lattice structure 80. The actual design of any given vascular engineered lattice structure may depend on geometry requirements, pressure loss, local cooling flow, cooling air heat pickup, thermal efficiency, film effectiveness, overall cooling effectiveness, aerodynamic mixing, and produceability considerations, among other gas turbine engine specific parameters. In one embodiment, the vascular engineered lattice structure 80 is sized based on a minimum size that can be effectively manufactured and that is not susceptible to becoming plugged by dirt or other debris.

The exemplary vascular engineered lattice structure 80 extends between a first wall 82 and a second wall 84 of the component 60. The first wall 82 is spaced from the second wall 84. The first wall 82 may be exposed to the gas path 62, whereas the second wall 84 may be remotely positioned from the gas path 62. For example, the second wall 84 could face into one of the cooling source cavities 72 of the cooling scheme 64 (see FIG. 2). The vascular engineered lattice structure 80 includes a thickness T between the first wall 82 and the second wall 84. The thickness T can be of any dimension.

Airflow 68 migrates through the vascular engineered lattice structure 80 to convectively cool the component 60. In this embodiment, the vascular engineered lattice structure 80 embodies a hollow configuration in which the airflow 68 may be circulated inside of the various passages defined by the vascular engineered lattice structure 80. For example, the hollow configuration of the vascular engineered lattice structure 80 may establish a porous flow area for the circulation of airflow 68. Additionally, airflow 68 could be communicated over and around the vascular engineered lattice structure 80.

The vascular engineered lattice structure 80 can be manufactured by using a variety of manufacturing techniques. For example, the vascular engineered lattice structure 80 may be created using an additive manufacturing process such as direct metal laser sintering (DMLS). Another additive manufacturing process that can be used to manufacture the vascular engineered lattice structure 80 is electron beam melting (EBM). In another embodiment, select laser sintering (SLS) or select laser melting (SLM) processes may be utilized.

In yet another embodiment, a casting process can be used to create the vascular engineered lattice structure 80. For example, an additive manufacturing process can be used to produce a ceramic or molybdenum based Refractory Metal Core (RMC) that can be used to cast the vascular engineered lattice structure 80. In one embodiment, the additive manufacturing process includes utilizing a powder bed technology for direct fabrication of airfoil lattice geometry features, while in another embodiment, the additive manufacturing process can be used to produce "core" geometry features which can then be integrated and utilized directly in the investment casting process using a lost wax process.

The exemplary vascular engineered lattice structure 80 includes a plurality of nodes 92, a plurality of branches 94 that extend between the nodes 92, and a plurality of hollow passages 96 between the branches 94 and the nodes 92. The number, size and distribution of nodes 92, branches 94 and hollow passages 96 can vary from the specific configuration shown. In other words, the configuration illustrated by FIG. 4 is but one possible design.

The branches 94 may extend orthogonally or non-orthogonally to the nodes 92. The nodes 92 and branches 94 can be manufactured as a single contiguous structure made of the same material. In one embodiment, the nodes 92 and branches 94 are uniformly distributed throughout the vascular engineered lattice structure 80. In another embodiment, the nodes 92 and branches 94 are non-uniformly distributed throughout the vascular engineered lattice structure 80.

In this "hollow lattice" structure configuration, airflow 68 can be circulated inside hollow passages 96 of the nodes 92 and the branches 94 to cool the component 60 in the space between the walls 82, 84 (see FIG. 3). For example, the "hollow" lattice structure may include multiple continuous hollow spoke cavity passages 96 thru which airflow 68 is passed. The airflow 68 flows from each of the hollow branches 94 and coalesces into the nodes 92, which serve as a plenum for the airflow 68 to be redistributed to the next set of hollow branches 94 and nodes 92. The "hollow" lattice structure forms multiple circuitous continuous passages in which the airflow 68 flows to maximize the internal convective cooling surface area and coolant mixing. Additionally, airflow 68 could be communicated over and around the nodes 92 and branches 94 of the vascular engineered lattice structure 80.

The nodes 92 and the branches 94 additionally act as structural members that can be tailored to "tune" steady and unsteady airfoil vibration responses in order to resist and optimally manage steady and unsteady pressure forces, centrifugal bending and curling stresses, as well as provide for improved airfoil local and section average creep and untwist characteristics and capability. In one embodiment, one or more of the nodes 92 and branches 94 may include augmentation features 95 (shown schematically in FIG. 4) that augment the heat transfer effect of the airflow 68 as it is communicated through the vascular engineered lattice structure 80. The augmentation features 95 can also be made using the additive manufacturing processes describe above.

As mentioned above, the vascular arrangement of the vascular engineered lattice structure 80 can be tailored to the specific cooling and structural needs of any given gas turbine engine component. For example, a first portion of the vascular engineered lattice structure 80 can include a different combination of nodes 92, branches 94 and hollow passages 96 compared to a second portion of the vascular engineered lattice structure 80. In one embodiment, a first portion of the vascular engineered lattice structure 80 may include a greater amount of cooling area whereas a second portion of the vascular engineered lattice structure 80 may provide a greater amount of structural area.

Figure 5A:
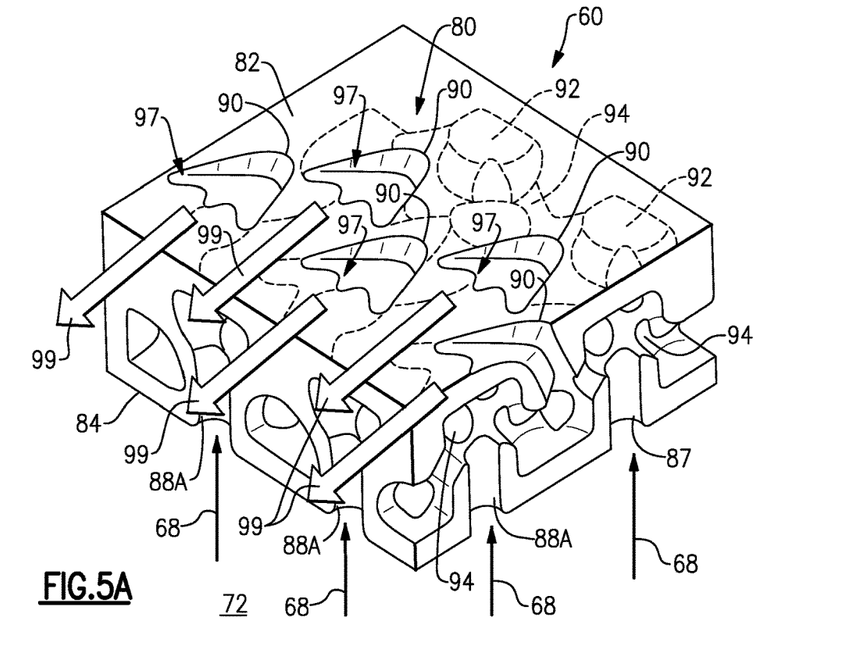
FIG. 5A shows additional features of an engineered vascular structure.

Referring to FIG. 5A, the vascular engineered lattice structure 80 can include one or more resupply inlet holes 88A and outlet holes 90. The component 60 includes at least one resupply inlet hole 88A provided between at least one inlet (such as inlet hole 87 formed in the second wall 84) and at least one outlet (such as the outlet holes 90) relative to a dimension, such as a length of the component 60. The at least one resupply inlet hole 88A serves to provide additional cooling flow into the hollow vascular engineered lattice structure, which maintains a relatively low and consistent temperature for the airflow 68 as it travels within the vascular engineered lattice structure 80. In general, the resupply inlet holes 88A are spaced and oriented in such a manner to optimize internal convective heat transfer, pressure loss, and coolant temperature heat pickup. The resupply geometry size, shape, orientation, and frequency is dependent upon convective and film cooling design objectives. For example, the relative orientation, size, and shape of any given resupply hole with respect to the internal flow field will be dictated by local internal geometric feature dimensions, as well as, desired internal pressure, Reynolds number, passage Mach number, and cooling air temperature requirements. Further, the orientation of a local resupply hole can also vary relative to the internal flow direction in order to minimize internal pressure and momentum mixing losses due to injection of high pressure and cooler air temperature.

In this embodiment, the resupply inlet holes 88A extend through the second wall 84 and connect the vascular engineered lattice structure 80 to a cavity 72 of the component 60. The outlet holes 90 are disposed in the first wall 82. Airflow 68 may be extracted from the cavity 72 as resupply air that is communicated through the resupply inlet holes 88A and into the nodes 92 and branches 94 of the vascular engineered lattice structure 80. In the illustrated example, the resupply inlet holes 88A communicate the airflow 68 directly into the nodes 92. In other examples, the resupply inlet holes 88A could communicate the airflow 68 directly into the branches 94. In either case, the airflow 68 may be circulated through the various nodes 92 and branches 94 to convectively cool the component 60. The airflow 68 may exit the vascular engineered lattice structure 80 through the outlet holes 90 as film cooling air 99. Regarding the geometry of the outlet holes 90, the relative amount of resupply to exit film hole bleed geometries may be dependent on local film cooling pressure, mass flux, and momentum flux ratio requirements in order to achieve optimal film cooling performance for a given hole shape geometry and engine operating condition.

Although multiple resupply inlet holes 88A and outlet holes 90 are depicted, any number of such holes can be incorporated into the vascular engineered lattice structure 80. When considering the number of such holes, however, a pressure of the airflow 68 should be selected to avoid backflow. In some examples, the airflow 68 is provided from a plenum in communication with each of the resupply inlet holes 88A. In that case, the plenum pressure is selected to provide effective cooling.

With further reference to FIG. 5A, the resupply inlet holes 88A are round in shape and the outlet holes 90 are film cooling holes having multi-lobed diffusion sections 97 (sometimes referred to as a "bell mouth" configuration). The geometry and shape of the inlet and outlet holes 88A, 90 could embody other geometries and shapes within the scope of this disclosure. Film hole geometries of any shape can be manufactured in order to provide the necessary adiabatic film effectiveness and can include but are not limited to round, conical, cone, diffused shaped, multi-lobed and/or slot film cooling geometries. Moreover, the holes 88A, 90 can be manufactured using an additive manufacturing process, including but not limited to, DMLS, EBM, SLS and SLM.

Further, the relative location of resupply and film hole exit geometry in relationship to the internal solid spoke and/or hollow spoke lattice geometries is predominately driven by the streamwise and lateral spacing considerations within a given cooling passage or flow circuit. The density distribution or lateral and streamwise spacing for a lattice array can vary within a cooling circuit as function of the required local thermal efficiency, convective cooling, and thermal cooling effectiveness necessary to achieve both local and global thermo-mechanical capability requirements.

Figure 5B:
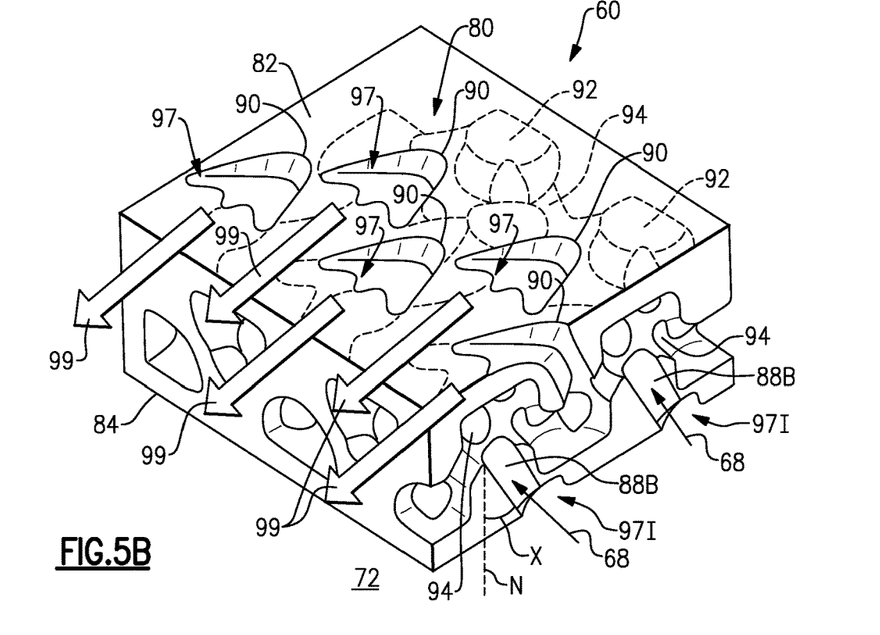
FIG. 5B shows additional features of the engineered vascular structure of FIG. 5A.

FIG. 5B is similar to the FIG. 5A, and illustrates additional, optional features for the resupply inlet holes. In FIG. 5A, the resupply inlet holes 88A are arranged such that they are substantially orthogonal to the wall 84. In FIG. 5B, however, the resupply inlet holes 88B are inclined at an angle X relative to a normal N to the wall 84. In this example, the angle X is an acute angle, and is selected to incline the resupply inlet holes 88B toward a source of the airflow 68. Inclining the resupply inlet holes 88B in such a manner may reduce pressure losses as the airflow 68 enters the resupply inlet holes 88B. Further, the angle X, which provides a relatively shallow angle, may be more desirable in some situations to the minimize the local momentum mixing loss at the location of resupply injection. If resupply injection is not executed properly, regions of stagnated internal flow, flow separation, and/or flow recirculation can be produced resulting in poor internal convective cooling and increased pressure loss. Additionally a shallow resupply hole angle will result in a longer hole length enabling the coolant flow within the resupply hole to become more fully developed, minimizing pressure loss due to flow separation and creating a more uniform velocity profile and flow distribution exiting the resupply hole into the cooling channel.

Further, while in the FIG. 5A arrangement the resupply inlet holes 88A are entirely round in shape, the resupply inlet holes 88B of FIG. 5B have an inlet section 97I with an increased dimension relative to the remainder of the resupply inlet holes 88B. In particular, in FIG. 5B, the inlet sections 97I have a multi-lobed shape (i.e., a "bell mouth" shape), which is similar in shape to the multi-lobed diffusion sections 97. Providing such a geometry at the inlet section 97I may further reduce pressure losses as the airflow 68 enters the resupply inlet holes 88A.

Figure 6A:
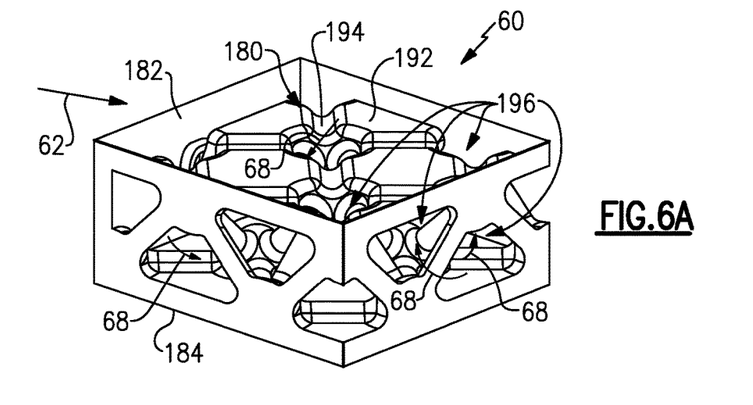
FIG. 6A illustrates another exemplary engineered vascular structure.
Figures 6B, 7:
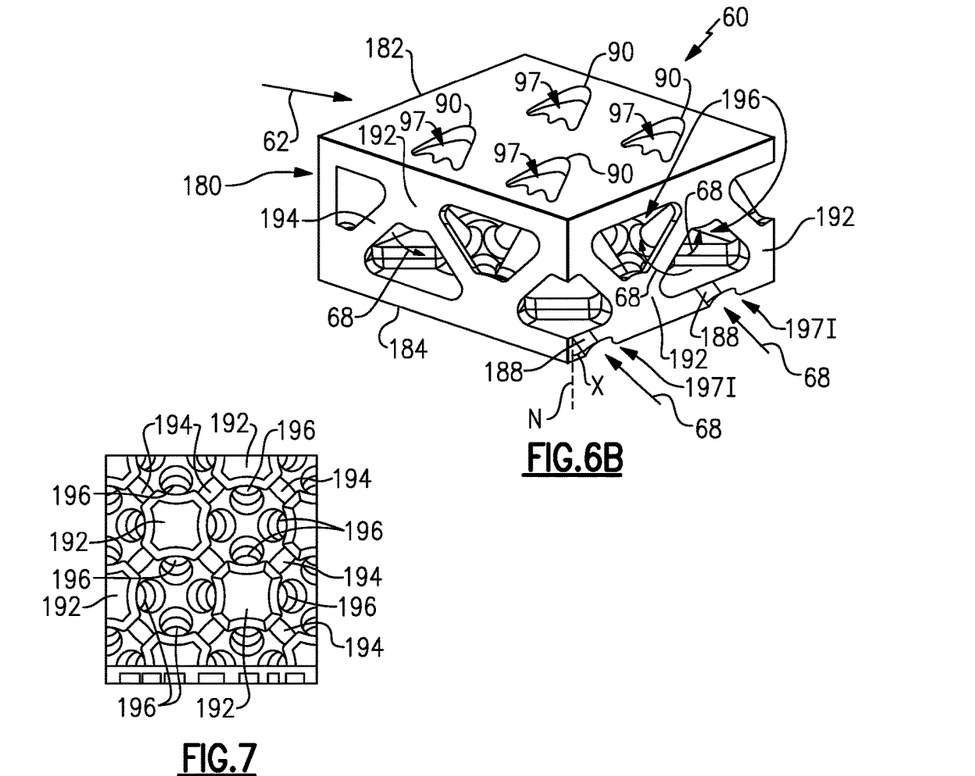
FIG. 6B shows additional features of the exemplary engineered vascular structure of FIG. 6A.
FIG. 7 illustrates another view of the engineered vascular structure of FIG. 6A.

FIGS. 6A and 7 illustrate another exemplary vascular engineered lattice structure 180. In this embodiment, the vascular engineered lattice structure 180 embodies a solid lattice structure in which airflow is communicated over and around the solid lattice structure thereby governing flow and providing structural support. The vascular engineered lattice structure 180 is disposed between a first wall 182 and a second wall 184 of the component 60.

The vascular engineered lattice structure 180 includes a plurality of nodes 192, a plurality of branches 194 that extend between the nodes 192, and a plurality of open passages 196 between the branches 194 and the nodes 192. The nodes 192, branches 194 and open passages 196 can be manufactured as a single contiguous structure made of the same material.

In this "solid" lattice structure configuration, airflow 68 can be circulated through the open passages 196 to cool the component 60 in the space between the walls 182, 184. In other words, in contrast to the hollow lattice structure embodiment which communicates airflow through the insides of the nodes 192 and branches 194, the airflow 68 is circulated over and around these parts as part of a porous flow area. For example, the "solid" lattice structure includes multiple continuous solid branches 194 over which airflow 68 is passed. The "solid" lattice structure forms circuitous passages for the airflow 68 to traverse around as it migrates through the vascular engineered lattice structure to maximize the convective cooling surface area and coolant mixing around the nodes 192 and the branches 194. The nodes 192 and the branches 194 additionally act as structural members that resist and dampen pressure, rotation forces, and vibratory loads.

The exemplary vascular engineered lattice structure 180 establishes a ratio of cooling area to structural area. The cooling area is established by the open passages 196, while the nodes 192 and branches 194 determine the amount of structural area. In one embodiment, the amount of cooling area exceeds the structural area (cooling area>structural area). In another embodiment, a ratio of the cooling area to the structural area is less than 1 (cooling area<structural area). In yet another embodiment, a ratio of the cooling area to the structural area is between 1 and 4. Other configurations are also contemplated.

FIGS. 5A-5B illustrate resupply inlet holes 88A, 88B relative to a hollow vascular engineered lattice structure.

However, it should be understood that the concept of resupply inlet holes can be applied to a solid vascular engineered lattice structure, such as that of FIG. 6A. In FIG. 6B, resupply inlet holes 188 are provided in the wall 184 and communicate airflow 68 into the solid vascular engineered lattice structure. In particular, the resupply inlet holes 188 communicate airflow 68 into a space (e.g., the open passages 196) between adjacent nodes 192. In the example of FIG. 6B, the resupply inlet holes 188 are inclined at a non-zero, acute angle X relative to a normal N to the wall 184. However, it should be understood that the angle X could be zero, such as in the example of the resupply inlet holes 88A of FIG. 5A. Further, in FIG. 6B, the resupply inlet holes 188 include an inlet section 197I which, in this example, is shaped substantially similar to the inlet section 97I of FIG. 5B. Alternatively, the resupply inlet holes 188 could be entirely round (cylindrical) in shape, as in the example of FIG. 5A, or exhibit alternative geometry shapes, such as, elliptical, racetrack, oval, teardrop, and/or multifaceted geometries types used independently and/or in conjunction with one another in order to best optimize internal convective heat transfer and pressure loss in order to optimize convective efficiency, cooling flow, and film cooling back flow margin requirements to ensure optimal performance for all operating conditions.

Figure 8:
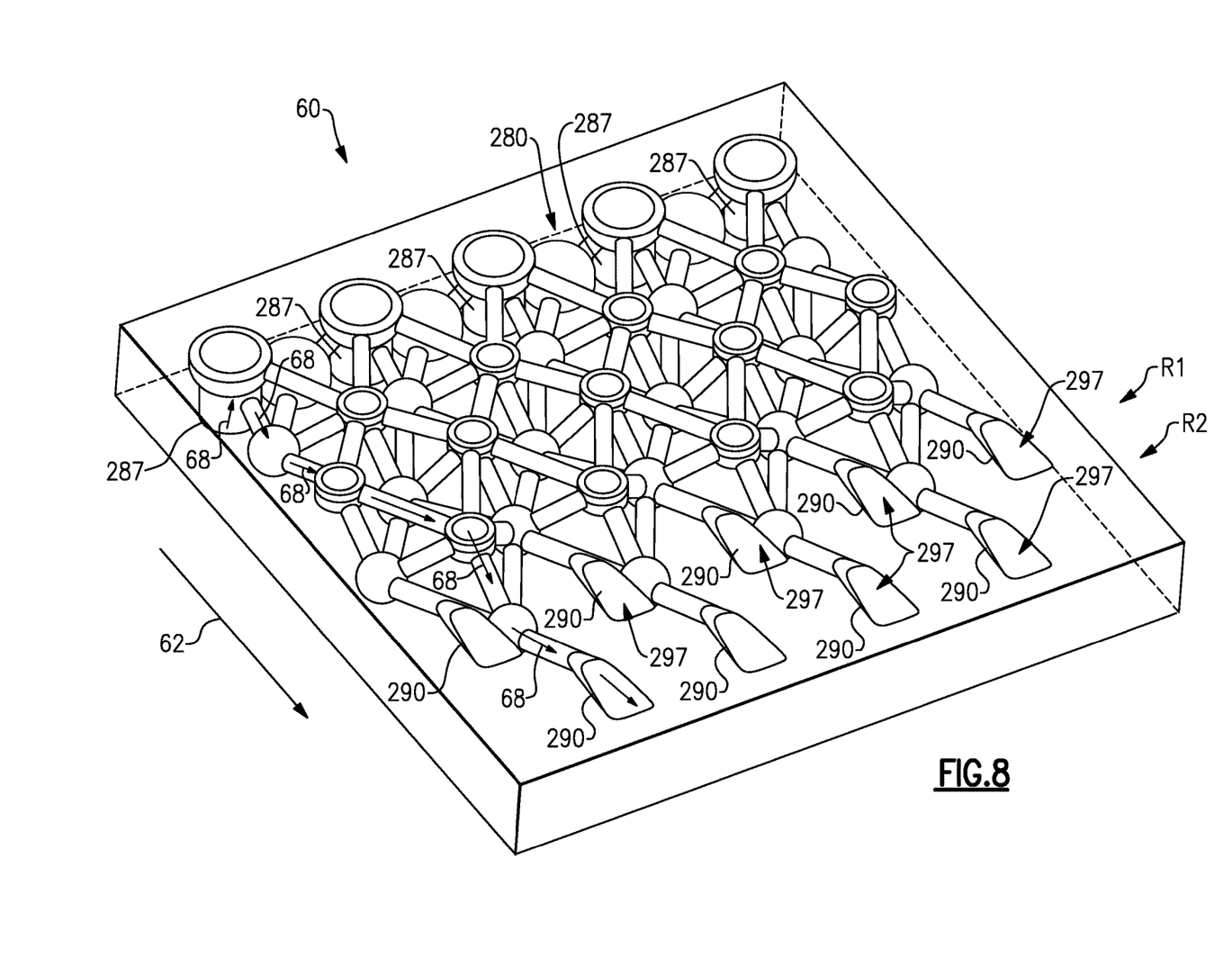
FIG. 8 illustrates another engineered vascular structure embodiment having a co-flow design.

The vascular engineered lattice structures can be configured in either a co-flow or counter-flow heat exchanger design concepts. For example, FIG. 8 depicts a vascular engineered lattice structure 280 providing a co-flow design. In other words, the airflow 68 is circulated through the vascular engineered lattice structure 280 in substantially the same direction as the gas path 62 flow direction. Although a hollow configuration is depicted, a co-flow design could also be incorporated into a "solid" spoke lattice configuration.

This particular vascular engineered lattice structure 280 includes a plurality of inlet holes 287 and a plurality of outlet holes 290. The outlet holes 290 of this embodiment are positioned in staggered rows R1 and R2 and include shaped diffusion sections 297. Of course, a single row of outlet holes 290 could also be utilized. The outlet holes 290 may embody alternative diffuser geometry shapes and orientation angles relative to the freestream external gas fluid. Outlet holes 290 may consist of single and/or multi-lobe diffused design geometries, and/or have a combination of expansion in either or both streamwise and lateral directions depending on film effectiveness requirements to mitigate high external heat load.

Figure 9:
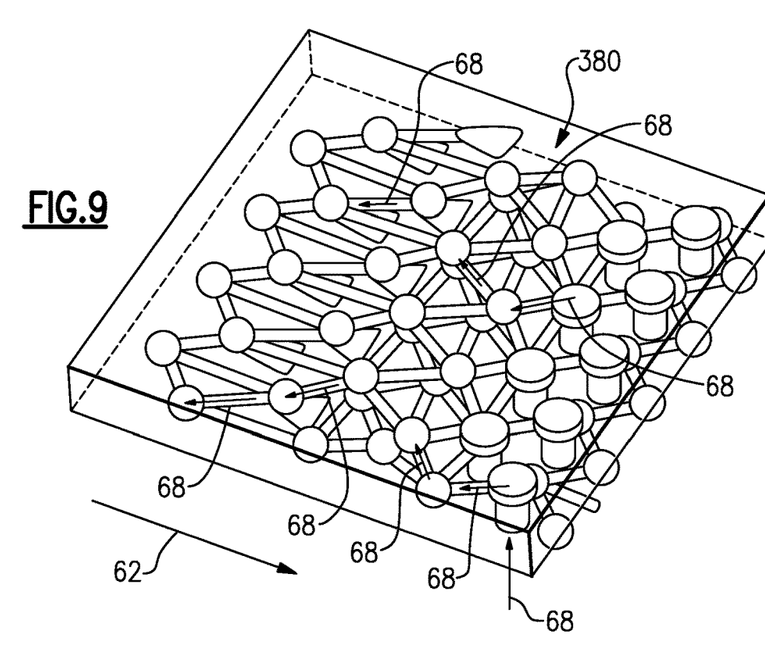
FIG. 9 illustrates another embodiment of an engineered vascular structure embodying a counter-flow design.

FIG. 9 illustrates yet another exemplary vascular engineered lattice structure 380 that could be incorporated into a gas turbine engine component. In this embodiment, the vascular engineered lattice structure 380 provides a counter-flow design. In other words, the airflow 68 is circulated through the vascular engineered lattice structure 380 in a direction that is generally opposite to the flow direction of the gas path 62.

Figure 10:
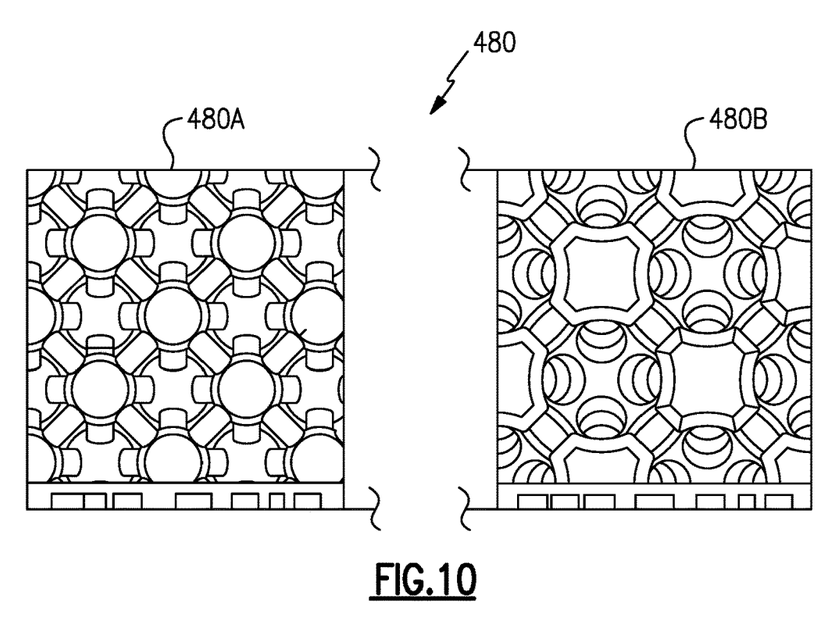
FIG. 10 illustrates yet another exemplary vascular engineered lattice structure.

FIG. 10 illustrates yet another exemplary vascular engineered lattice structure 480 that could be incorporated into a gas turbine engine component. In this embodiment, the vascular engineered lattice structure 480 includes a first portion 480A that can include a hollow lattice structure and a second portion 480B that can include a solid lattice structure. The distribution and interchangeability of the hollow and solid lattice structures is dependent on design requirements and other considerations.

The exemplary vascular engineered lattice structures described in this disclosure may be incorporated into any relatively high heat load gas turbine engine applications where both convective and film cooling is desired. Among other possible design configurations, the vascular engineered lattice structures of this disclosure may be implemented as a co-flow or counter-flow configurations and may either include or exclude airflow resupply to more efficiently provide localized convective cooling and film cooling to achieve extended component operating life.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A component, comprising:
    a wall; and
    a hollow vascular engineered lattice structure formed inside of said wall, said hollow vascular engineered lattice structure having an inlet hole and an outlet hole that communicate fluid into and out of said hollow vascular engineered lattice structure, said hollow vascular engineered lattice structure further having at least one resupply inlet hole between said inlet hole and said outlet hole with respect to a dimension of said component to communicate additional fluid into said hollow vascular engineered lattice structure; and
    wherein said at least one resupply inlet hole has an inlet section with an increased dimension relative to a remainder of said at least one resupply inlet hole.

2. The component as recited in claim 1, wherein said hollow vascular engineered lattice structure includes hollow passages that extend through one or more nodes and one or more branches of said hollow vascular engineered lattice structure.

3. The component as recited in claim 2, wherein said at least one resupply inlet hole is configured to communicate fluid into one of said one or more nodes.

4. The component as recited in claim 2, wherein said one or more nodes and one or more branches are one of (1) uniformly distributed throughout said hollow vascular engineered lattice structure and (2) non-uniformly distributed throughout said hollow vascular engineered lattice structure.

5. The component as recited in claim 2, wherein said one or more branches are one of (1) orthogonal to said one or more nodes and (2) non-orthogonal to said one or more nodes.

6. The component as recited in claim 1, wherein said at least one resupply inlet hole is inclined at a non-zero angle relative to a normal to said wall.

7. The component as recited in claim 6, comprising:
a lattice cavity defined between internal surfaces of said wall and external surfaces of said hollow vascular engineered lattice structure;
wherein said wall defines exterior surfaces of said component;
wherein said hollow vascular structure is defined by a plurality of nodes and a plurality of branches each extending from at least one of said plurality of nodes, with respective internal passages defined within each node of said plurality of nodes and within each branch of said plurality of branches for communicating fluid, said internal passages being distinct from said lattice cavity;
wherein said at least one resupply inlet hole is a plurality of resupply inlet holes each configured to communicate fluid between a cooling source cavity and a respective node of the plurality of nodes; and
wherein said outlet hole is a plurality of film cooling holes.

8. The component as recited in claim 7, wherein said plurality of nodes and said plurality of branches are spaced apart from said internal surfaces such that fluid is communicated in said lattice cavity around and over said plurality of nodes and said plurality of branches, and said inlet section has a multi-lobed shape.

9. The component as recited in claim 1, wherein said hollow vascular engineered lattice structure is one of a co-flow vascular engineered lattice structure and a counter-flow vascular engineered lattice structure.

10. The component as recited in claim 1, wherein said outlet hole is a film cooling hole.

11. A component, comprising:
a wall;
a solid vascular engineered lattice structure formed inside of said wall, said solid vascular engineered lattice structure having an inlet hole and an outlet hole that communicate fluid into and out of said solid vascular engineered lattice structure, said solid vascular engineered lattice structure further having at least one resupply inlet hole between said inlet hole and said outlet hole with respect to a dimension of said component to communicate additional fluid into said solid vascular engineered lattice structure; and
wherein said at least one resupply inlet hole has an inlet section with an increased dimension relative to a remainder of said at least one resupply inlet hole.

12. The component as recited in claim 11, wherein said solid vascular structure includes a plurality of nodes, a plurality of branches that extend between said plurality of nodes, and a plurality of passages extending between said plurality of nodes and said plurality of branches.

13. The component as recited in claim 12, wherein said at least one resupply inlet hole is configured to communicate fluid into a space between adjacent ones of said plurality of nodes.

14. The component as recited in claim 12, wherein said plurality of nodes and said plurality of branches are one of (1) uniformly distributed throughout said solid vascular engineered lattice structure and (2) non-uniformly distributed throughout said solid vascular engineered lattice structure.

15. The component as recited in claim 12, wherein said plurality of branches are one of (1) orthogonal to said plurality of nodes and (2) non-orthogonal to said plurality of nodes.

16. The component as recited in claim 11, wherein said at least one resupply inlet hole is inclined at a non-zero angle relative to a normal to said wall.

17. The component as recited in claim 16, wherein:
interconnected lattice passages are defined between internal surfaces of said wall and external surfaces of said solid vascular engineered lattice structure;
said solid vascular engineered lattice structure includes a plurality of nodes and a plurality of branches that extend between said plurality of nodes, said lattice passages extending between said plurality of nodes and said plurality of branches, with at least some of said plurality of branches being spaced apart from said internal surfaces such that fluid is communicated from a cooling source cavity, through said at least one resupply inlet hole into said solid vascular engineered lattice structure and then around and over said plurality of nodes and said plurality of branches; and
said wall defines exterior surfaces of said component.

18. The component as recited in claim 17, wherein said wall is part of a combustor panel of a gas turbine engine.

19. The component as recited in claim 11, wherein said outlet hole is a film cooling hole.

20. The component as recited in claim 11, wherein said wall is part of a blade, a vane or a blade outer air seal (BOAS) of a gas turbine engine.

21. A method for producing a component, comprising the steps of:
forming a vascular engineered lattice structure inside of a wall of the component, said vascular engineered lattice structure having at least one of a hollow lattice structure and a solid lattice structure and including an inlet hole and an outlet hole that communicate fluid into and out of said vascular engineered lattice structure, said vascular engineered lattice structure further including at least one resupply inlet hole between said inlet hole and said outlet hole with respect to a dimension of said component to communicate additional fluid into said vascular engineered lattice structure; and
wherein said at least one resupply inlet hole has an inlet section with an increased dimension relative to a remainder of said at least one resupply inlet hole.

22. The method as recited in claim 21, wherein the step of forming the vascular engineered lattice structure includes:
forming a core using an additive manufacturing process; and
using the core to cast the vascular engineered lattice structure.

* * * * *